United States Patent
Tai et al.

(10) Patent No.: US 12,382,402 B2
(45) Date of Patent: Aug. 5, 2025

(54) WIRELESS TRANSCEIVER DEVICE, WIRELESS COMMUNICATION SYSTEM AND WIRELESS TRANSMISSION RATE CONTROL METHOD

(71) Applicant: Realtek Semiconductor Corporation, Hsinchu (TW)

(72) Inventors: Tzu-Hao Tai, Hsinchu (TW); Chien-Hsun Liao, Hsinchu (TW); Yuan-Han Zhan, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 45 days.

(21) Appl. No.: 18/603,230

(22) Filed: Mar. 13, 2024

(65) Prior Publication Data
US 2024/0323862 A1 Sep. 26, 2024

(30) Foreign Application Priority Data
Mar. 20, 2023 (TW) ................ 112110282

(51) Int. Cl.
 *H04W 52/26* (2009.01)
 *H04B 1/40* (2015.01)
 *H04L 27/26* (2006.01)

(52) U.S. Cl.
 CPC ............ *H04W 52/262* (2013.01); *H04B 1/40* (2013.01); *H04L 27/2626* (2013.01)

(58) Field of Classification Search
 CPC ..... H04W 52/262; H04B 1/40; H04L 27/2626
 See application file for complete search history.

(56) References Cited

U.S. PATENT DOCUMENTS

| 8,861,499 | B1 | 10/2014 | Narasimhan et al. |
| 2017/0302109 | A1* | 10/2017 | Lee .......... H02J 50/23 |
| 2019/0109621 | A1* | 4/2019 | Liu .......... H04L 25/03242 |

* cited by examiner

*Primary Examiner* — Sung S Ahn
(74) *Attorney, Agent, or Firm* — CKC & Partners Co., LLC (57) ABSTRACT

A wireless transceiver device includes a communication module and a processor. The communication module is used for receiving and demodulating a radio frequency signal from a wireless signal transmitting-receiving end into a first data frame. The processor is coupled to the communication module and used for performing the following operations: obtaining a first modulation order from the first data frame; determining a second modulation order corresponding to a second data frame that is to be transmitted by the wireless transceiver device; and determining a transmission mode from a frame transmission rate table according to a smaller one of the first modulation order and the second modulation order for the wireless transceiver device to send a response frame to the wireless signal transmitting-receiving end in response to the first data frame.

20 Claims, 5 Drawing Sheets

| Modulation Order | 1 | 2 | 3 | 4 | 5 | 6 |
|---|---|---|---|---|---|---|
| Available Transmission Mode | OFDM 9M | OFDM 18M | OFDM 36M | OFDM 54M | OFDM 54M | OFDM 54M |
| | OFDM 6M | OFDM 12M | OFDM 24M | OFDM 48M | OFDM 48M | OFDM 48M |
| | | OFDM 9M | OFDM 18M | OFDM 36M | OFDM 36M | OFDM 36M |
| | | OFDM 6M | OFDM 12M | OFDM 24M | OFDM 24M | OFDM 24M |
| | | | OFDM 9M | OFDM 18M | OFDM 18M | OFDM 18M |
| | | | OFDM 6M | OFDM 12M | OFDM 12M | OFDM 12M |
| | | | | OFDM 9M | OFDM 9M | OFDM 9M |
| | | | | OFDM 6M | OFDM 6M | OFDM 6M |

WIRELESS TRANSCEIVER DEVICE, WIRELESS COMMUNICATION SYSTEM AND WIRELESS TRANSMISSION RATE CONTROL METHOD

RELATED APPLICATIONS

This application claims priority to Taiwan Application Serial Number 112110282, filed Mar. 20, 2023, which is herein incorporated by reference.

BACKGROUND

Technical Field

The present disclosure relates to wireless transmission rate control, and more particularly to a wireless transceiver device, a wireless communication system, and a wireless transmission rate control method having a wireless transmission rate determination function.

Description of Related Art

Selection of frame transmission rate is the key to effectively using the channel bandwidth and improving the transmission performance in a wireless communication system. If the data transmission rate is higher, the transmission performance is also increased accordingly. However, for some wireless transceiver devices with limited electrical energy, power consumption is the main consideration and limitation, and wireless communication systems supporting various bandwidths and transmission rates also have different power consumption requirements. As for the power consumption of the wireless transceiver devices, more electrical energy can be saved as the transmission time is shorter under the same transmission power or as the transmission power is lower under the same transmission time. Therefore, how to balance the transmission performance and the power consumption of the wireless communication system is one of the major objectives in the related industries.

SUMMARY

One aspect of the present disclosure directs to a wireless transceiver device which includes a communication module and a processor. The communication module is used for receiving and demodulating a radio frequency signal from a wireless signal transmitting-receiving end into a first data frame. The processor is coupled to the communication module, and is configured to perform the following operations: obtaining a first modulation order corresponding from the first data frame; determining a second modulation order corresponding to a second data frame that is to be transmitted by the wireless transceiver device; and determining a transmission mode from a frame transmission rate table according to a smaller one of the first modulation order and the second modulation order for the wireless transceiver device to send a response frame to the wireless signal transmitting-receiving end in response to the first data frame.

Another aspect of the present disclosure directs to a wireless communication system having a first wireless transceiver device and a second wireless transceiver device that are communicatively connected to each other, in which the second wireless transceiver device is configured to perform the following operations after receiving a first data frame from the first wireless transceiver device: obtaining a first modulation order from the first data frame; determining a second modulation order corresponding to a second data frame that is to be transmitted by the second wireless transceiver device; and determining a transmission mode from a frame transmission rate table according to a smaller one of the first modulation order and the second modulation order for the second wireless transceiver device to send a response frame to the first wireless transceiver device in response to the first data frame.

Yet another aspect of the present disclosure directs to a wireless transmission rate control method adapted to a wireless transceiver device. The wireless transmission rate control method includes: receiving a first data frame that is transmitted by a wireless signal transmitting-receiving end; obtaining a first modulation order from the first data frame; determining a second modulation order corresponding to a second data frame that is to be transmitted by the wireless transceiver device; and determining a transmission mode from a frame transmission rate table according to a smaller one of the first modulation order and the second modulation order for the wireless transceiver device to send a response frame to the wireless signal transmitting-receiving end in response to the first data frame.

BRIEF DESCRIPTION OF THE DRAWINGS

The foregoing aspects and many of the accompanying advantages of this disclosure will become more readily appreciated as the same becomes better understood by reference to the following detailed description, when taken in conjunction with the accompanying drawings.

DETAILED DESCRIPTION

The detailed explanation of the disclosure is described as following. The described preferred embodiments are presented for purposes of illustrations and description, and they are not intended to limit the scope of the disclosure.

In the present disclosure, the wireless transceiver device may be implemented in various embodiments, including but not limited to a mobile wireless transceiver device such as a station (STA), a notebook, a mobile phone and a tablet and/or a fixed wireless transceiver device such as an access point (AP), a router, a switch, a computer device, a server device and a workstation.

According to the current Wi-Fi system specifications, the transmission modes adopted in the Wi-Fi system may include orthogonal frequency division multiplexing (OFDM) transmission modes (including OFDM 6M, OFDM 9M, OFDM 12M, OFDM 18M, OFDM 24M, OFDM 36M, OFDM 48M, and OFDM 54M transmission modes, in which the transmission rate of OFDM 6M is 6 Mbps, the transmission rate of OFDM 9M is 9 Mbps, etc.), High Throughput (HT) modes (including HT MCS0 to HT MCS31 transmission modes), Very High Throughput (VHT) modes (including combinations of 1SS-8SS and MCS0-MCS9), and High Efficiency (HE) modes (including combinations of 1SS-8SS and MCS0-MCS11). More transmission modes are usable for a wireless transceiver device if the hardware specification thereof is better and the Wi-Fi system supported thereby is more advanced. In general, in order to perform data transmissions in various Wi-Fi systems (e.g., Wi-Fi 5, Wi-Fi 6, Wi-Fi 6E, etc.), typically the frame transmission rate is determined according to one of the 8 OFDM modes described above.

Figure 1:
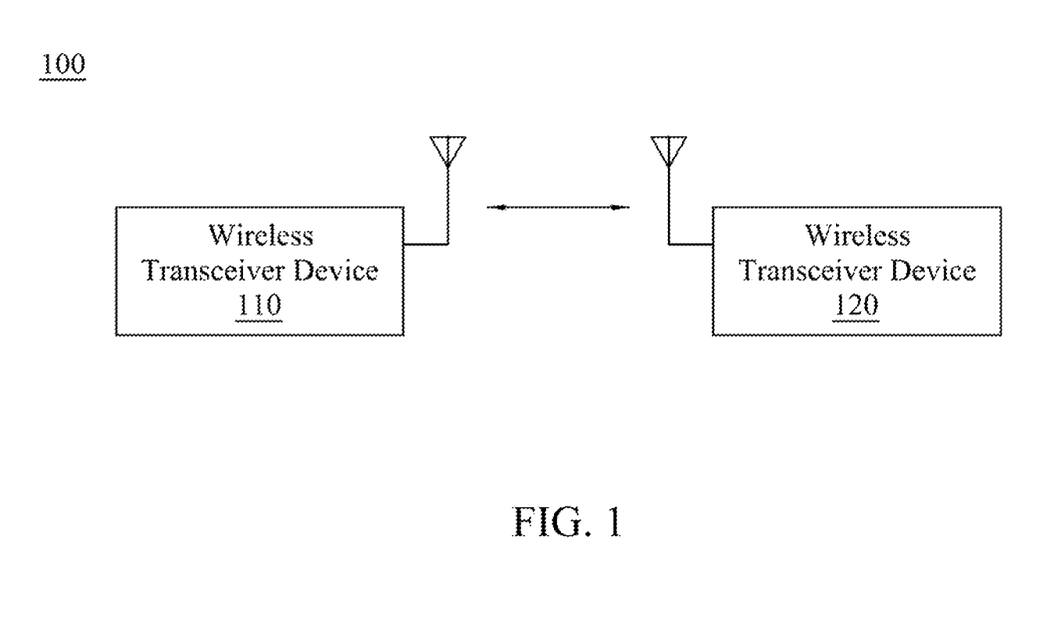
FIG. 1 is a schematic diagram of a wireless communication system in accordance with some embodiments of the present disclosure.

Referring to FIG. 1, FIG. 1 illustrates a schematic diagram of a wireless communication system 100 in accordance with some embodiments of the present disclosure. The communication technology adopted in the wireless communication system 100 may be, for example, a wireless local area network (WLAN) communication technology in compliance with IEEE 802.11 standards (including IEEE 802.11ac, IEEE 802.11ax, etc.) and/or another suitable wireless communication technology. The wireless communication system 100 includes wireless transceiver devices 110 and 120 that are communicatively connected through a wireless channel. The wireless channel in the wireless communication system 100 may support multiple-input multiple-output (MIMO), multiple-input single-output (MISO), single-input multiple-output (SIMO), and/or single-input single-output (SISO) transmissions between the wireless transceiver devices 110 and 120.

Figure 2:
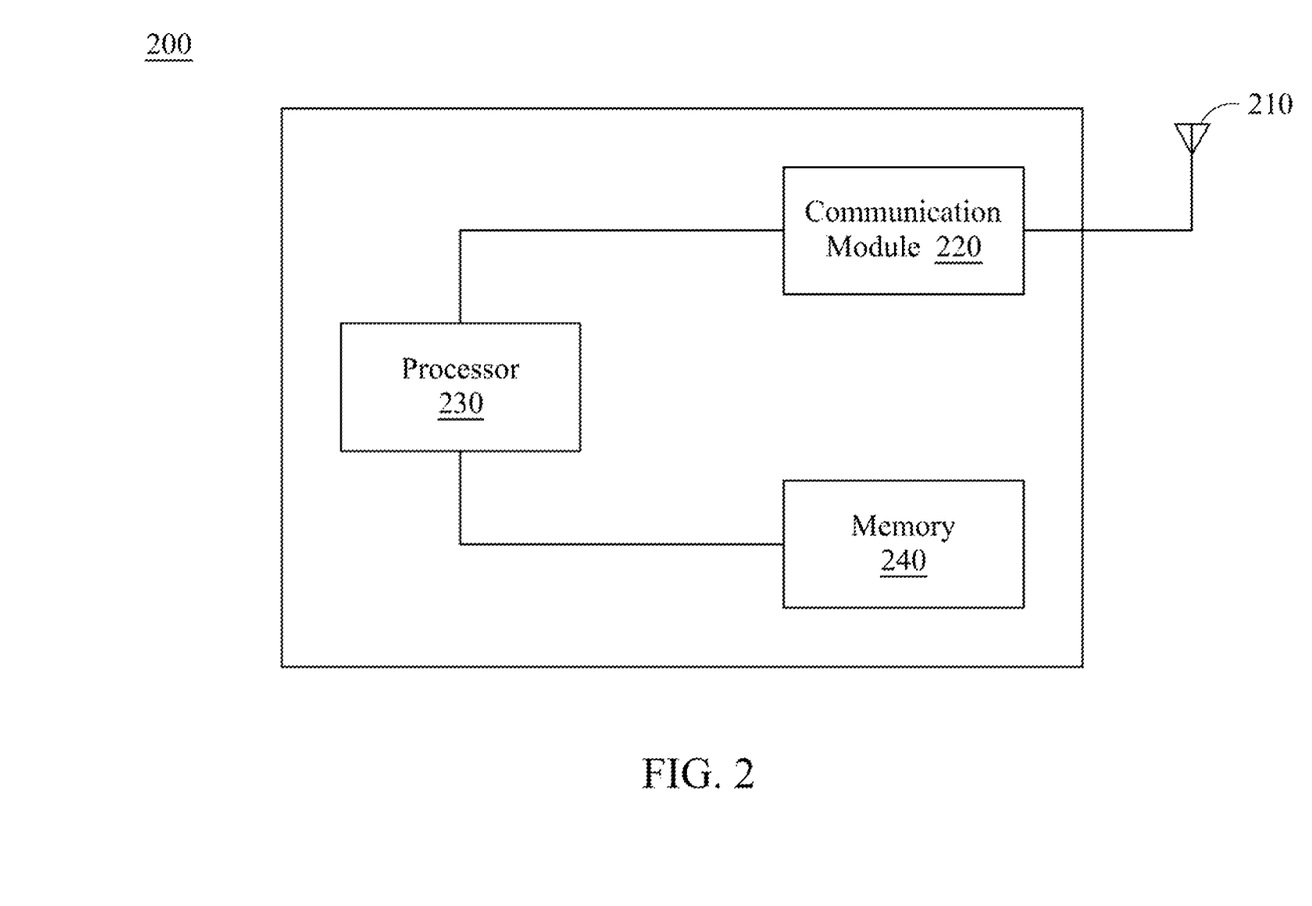
FIG. 2 is a circuit block diagram of a wireless transceiver device in accordance with some embodiments of the present disclosure.

FIG. 2 is a block diagram of a wireless transceiver device 200 in accordance with some embodiments of the present disclosure. The wireless transceiver device 200 may be the wireless transceiver device 110 and/or 120 in FIG. 1. The wireless transceiver device 200 includes an antenna 210, a communication module 220, a processor 230 and a memory 240. The antenna 210 is arranged for radio frequency (RF) signal transmissions and receptions. In some embodiments, the wireless transceiver device 200 may include multiple antennas 210 that can be used for multiple-input and/or multiple-output RF signal transmissions and receptions. The communication module 220 is coupled to the antenna 210, and is used for receiving and demodulating RF signals into data frames and response frames as well as modulating data frames and response frames into RF signals. The processor 230 is coupled to the communication module 220 and the memory 240, and is used for determining transmission modes of data frames and response frames according to device performance and configurations as well as received data frames. The processor 230 may be, for example, a conventional processor, a multi-core processor, a digital signal processor (DSP), a microprocessor, or an application-specific integrated circuit (ASIC), but is not limited thereto. The memory 240 may be any data storage device that can be read and executed by the processor 230. The memory 240 may be, for example, a subscriber identity module (SIM), a read-only memory (ROM), an erasable programmable ROM (EPROM), an electrically erasable programmable ROM (EEPROM), a random access memory (RAM), a CD-ROM, a magnetic tape, a hard disk drive, a solid state drive, a flash, or another data storage device suitable for storing program codes, but is not limited thereto.

Figure 3:
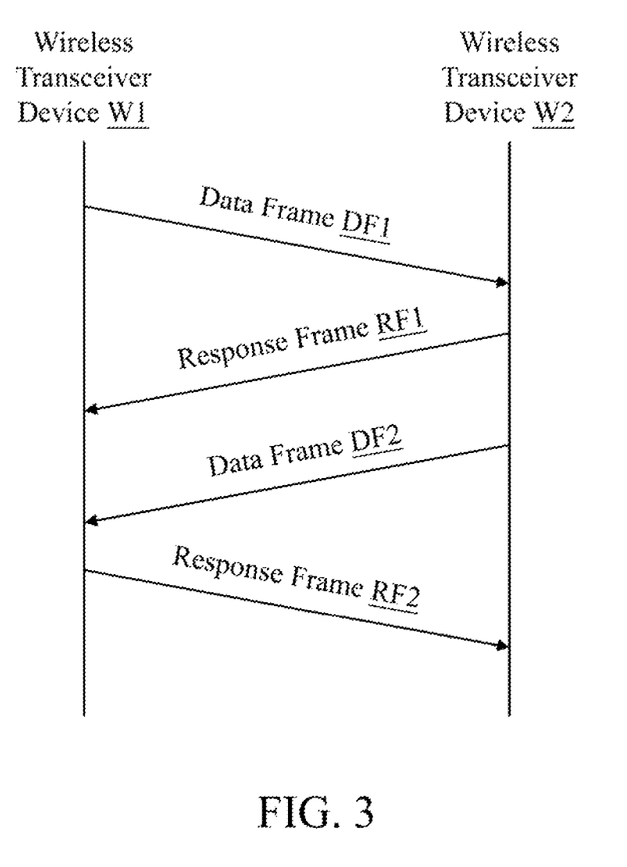
FIG. 3 is an example of frame transmissions between wireless transceiver devices.

FIG. 3 is an example of frame transmissions between wireless transceiver devices W1 and W2. The wireless transceiver devices W1 and W2 may be the wireless transceiver devices 110 and 120 in FIG. 1, respectively, or vice versa. As shown in FIG. 3, after the wireless transceiver device W1 transmits a data frame DF1 to the wireless transceiver device W2 (at this time, the wireless transceiver devices W1 and W2 are a transmitting terminal and a receiving terminal, respectively), the wireless transceiver device W2 successfully receives and correctly demodulates the data frame DF1, and transmit a response frame RF1 to the wireless transceiver device W1 for notifying the wireless transceiver device W1 that the data frame DF1 is successfully transmitted. The data frame DF1 has to be retransmitted if the wireless transceiver device W1 does not successfully receive the response frame RF1. Similarly, after the wireless transceiver device W2 transmits a data frame DF2 to the wireless transceiver device W1 (at this time, the wireless transceiver device W1 and W2 are a receiving terminal and a transmitting terminal, respectively), the wireless transceiver device W1 successfully receives and correctly demodulates the data frame DF2, and transmits a response frame RF2 to the wireless transceiver device W2 for notifying the wireless transceiver device W2 that the data frame DF2 is successfully transmitted. The data frame DF2 has to be retransmitted if the wireless transceiver device W2 does not successfully receive the response frame RF2.

For a wireless transceiver device, the required transmission power is higher as the frame transmission rate is higher. For the example shown in FIG. 3, if the transmission power of the wireless transceiver device W2 is significantly less than the transmission power of the wireless transceiver device W1 (e.g., the wireless transceiver devices W1 and W2 are respectively an access point and a mobile device), the wireless transceiver device W2 shall decrease the transmission rate when transmitting the response frame RF1 (e.g., by adopting a transmission mode with a lower transmission rate), or otherwise the wireless transceiver device W1 cannot successfully receive the response frame RF1 due to inadequate power for transmitting the response frame RF1 by the wireless transceiver device W2 (i.e., unable to meet the corresponding transmission rate requirement). The response frame RF1 cannot be successfully received until the transmission rate of the wireless transceiver device W1 is reduced to be consistent with the transmission rate of the wireless transceiver device W2, which results in increasing of the transmission time and decreasing of the transmission efficiency. In the embodiments of the present disclosure, the wireless transceiver device W2 can determine a suitable transmission rate before transmitting the response frame RF1, in order to avoid failing to successfully receive the response frame RF1 and having to retransmit the data frame DF1 by the wireless transceiver device W1 due to that the transmission power of the response frame RF1 does not meet the corresponding transmission rate requirement, thereby achieving the optimal transmission efficiency of the system.

For the OFDM transmission modes adopted to transmit response frames, each OFDM transmission mode defines a corresponding modulation mode and a corresponding modulation order. Different OFDM transmission modes correspond to different transmission rates. For example, OFDM 6M transmission mode corresponds to a transmission rate of 6 Mbps, OFDM 9M transmission mode corresponds to a transmission rate of 9 Mbps, and so on. Table 1 lists modulation modes and modulation orders corresponding to various OFDM transmission modes (transmission rates). As can be seen from Table 1, the modulation mode and the modulation order corresponding to OFDM 6M and OFDM 9M transmission modes are respectively binary phase shift keying (BPSK) and 1, the modulation mode and the modulation order corresponding to OFDM 12M and OFDM 18M transmission modes are respectively quadrature phase shift keying (QPSK) and 2, the modulation mode and the modulation order corresponding to OFDM 24M and OFDM 36M transmission modes are respectively 16-QAM (note that QAM is the abbreviation of quadrature amplitude modulation) and 3, and the modulation mode and the modulation order corresponding to OFDM 48M and OFDM 54M transmission modes are respectively 64-QAM and 4.

TABLE 1

| OFDM Transmission Mode | Modulation Mode | Modulation Order |
| --- | --- | --- |
| OFDM 54M | 64-QAM | 4 |
| OFDM 48M | 64-QAM | 4 |
| OFDM 36M | 16-QAM | 3 |
| OFDM 24M | 16-QAM | 3 |
| OFDM 18M | QPSK | 2 |
| OFDM 12M | QPSK | 2 |
| OFDM 9M | BPSK | 1 |
| OFDM 6M | BPSK | 1 |

In addition, according to the IEEE 802.11 standard, the modulation order corresponding to the transmission rate of the response frame shall be less than or equal to the modulation order corresponding to the transmission rate of the data frame. Typically, the transmission mode with the highest transmission rate is selected from all available transmission modes for achieving the highest transmission efficiency of the system. Table 2 lists the modulation modes and the modulation orders defined by various HE transmission modes and the corresponding transmission mode with the highest transmission rate among the corresponding available OFDM transmission modes. It is noted that the modulation modes and the modulation orders defined by the data frame transmission rate of other modes (e.g., VHT mode) and the corresponding transmission mode with the highest transmission rate among the available OFDM transmission modes are omitted in the context for the sake of brevity.

TABLE 2

| Transmission Mode | Modulation Mode | Modulation Order | OFDM Transmission Mode |
| --- | --- | --- | --- |
| HE MCS11 | 1024-QAM | 6 | OFDM 54M |
| HE MCS10 | 1024-QAM | 6 | OFDM 54M |
| HE MCS9 | 256-QAM | 5 | OFDM 54M |
| HE MCS8 | 256-QAM | 5 | OFDM 54M |
| HE MCS7 | 64-QAM | 4 | OFDM 54M |
| HE MCS6 | 64-QAM | 4 | OFDM 54M |
| HE MCS5 | 64-QAM | 4 | OFDM 54M |
| HE MCS4 | 16-QAM | 3 | OFDM 36M |
| HE MCS3 | 16-QAM | 3 | OFDM 36M |
| HE MCS2 | QPSK | 2 | OFDM 18M |
| HE MCS1 | QPSK | 2 | OFDM 18M |
| HE MCS0 | BPSK | 1 | OFDM 9M |

Figure 4:
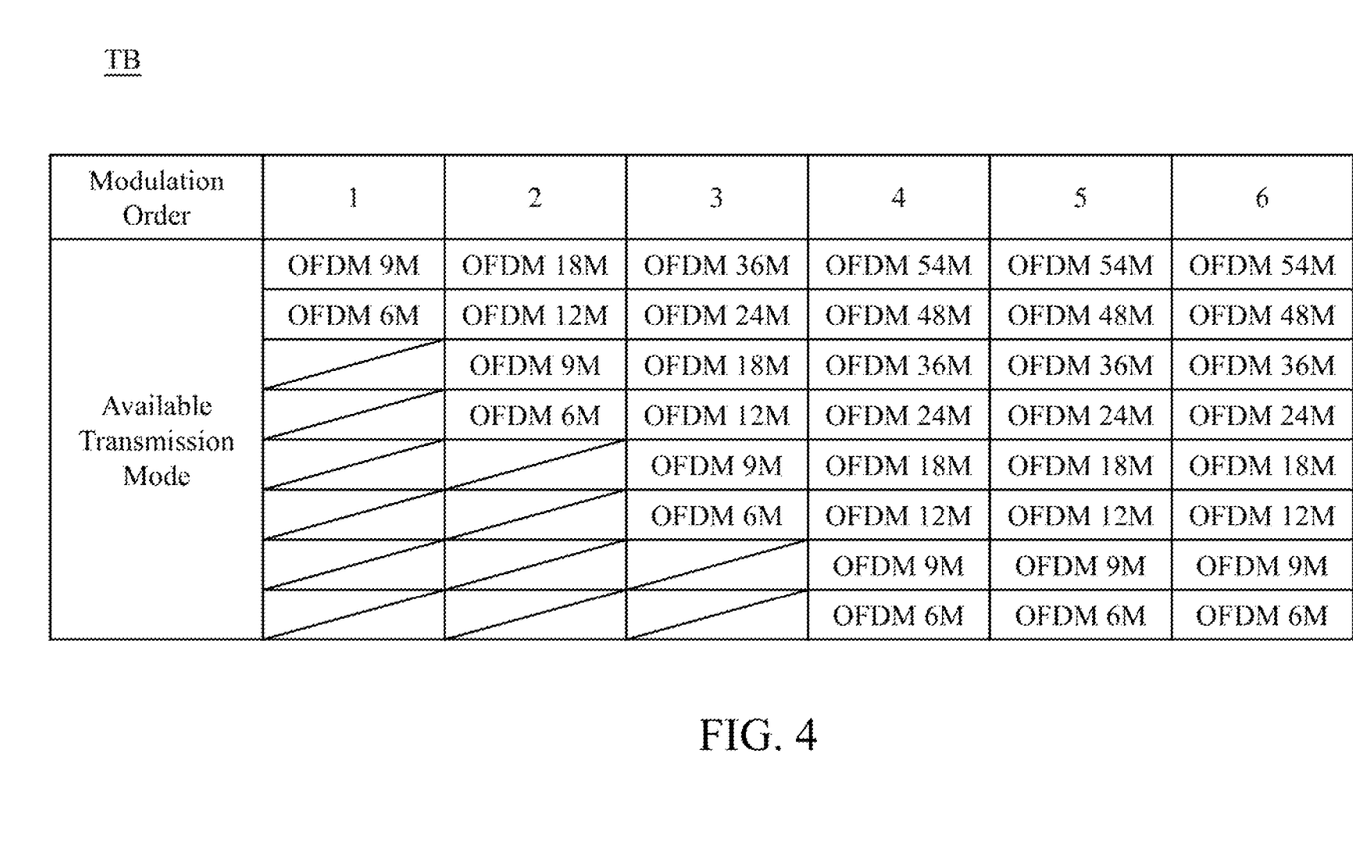
FIG. 4 illustrates a frame transmission rate table in accordance with one example of the present disclosure.

FIG. 4 shows a frame transmission rate table TB for determining a transmission mode of a response frame in accordance with one example of the present disclosure. As can be seen from Tables 1 and 2, when the modulation order is 1, the available transmission modes for frame transmissions include OFDM 6M and OFDM 9M transmission modes. When the modulation order is 2, the available transmission modes for frame transmissions include OFDM 6M, OFDM 9M, OFDM 12M, and OFDM 18M transmission modes. When the modulation order is 3, the available transmission modes for frame transmissions include OFDM 6M, OFDM 9M, OFDM 12M, OFDM 18M, OFDM 24M, and OFDM 36M transmission modes. When the modulation order is 4 or higher, the available transmission modes for frame transmission include OFDM 6M, OFDM 9M, OFDM 12M, OFDM 18M, OFDM 24M, OFDM 36M, OFDM 48M, and OFDM 54M transmission modes. Thus, the frame transmission rate table TB, which includes all available transmission modes for frame transmissions in various modulation orders, can be established according to the aforementioned rule. The content of the frame transmission rate table TB may be correspondingly changed according to system design requirements. For example, when the modulation order is 2, the available transmission modes may be changed to OFDM 6M, OFDM 9M, and OFDM 12M transmission modes.

Figure 5:
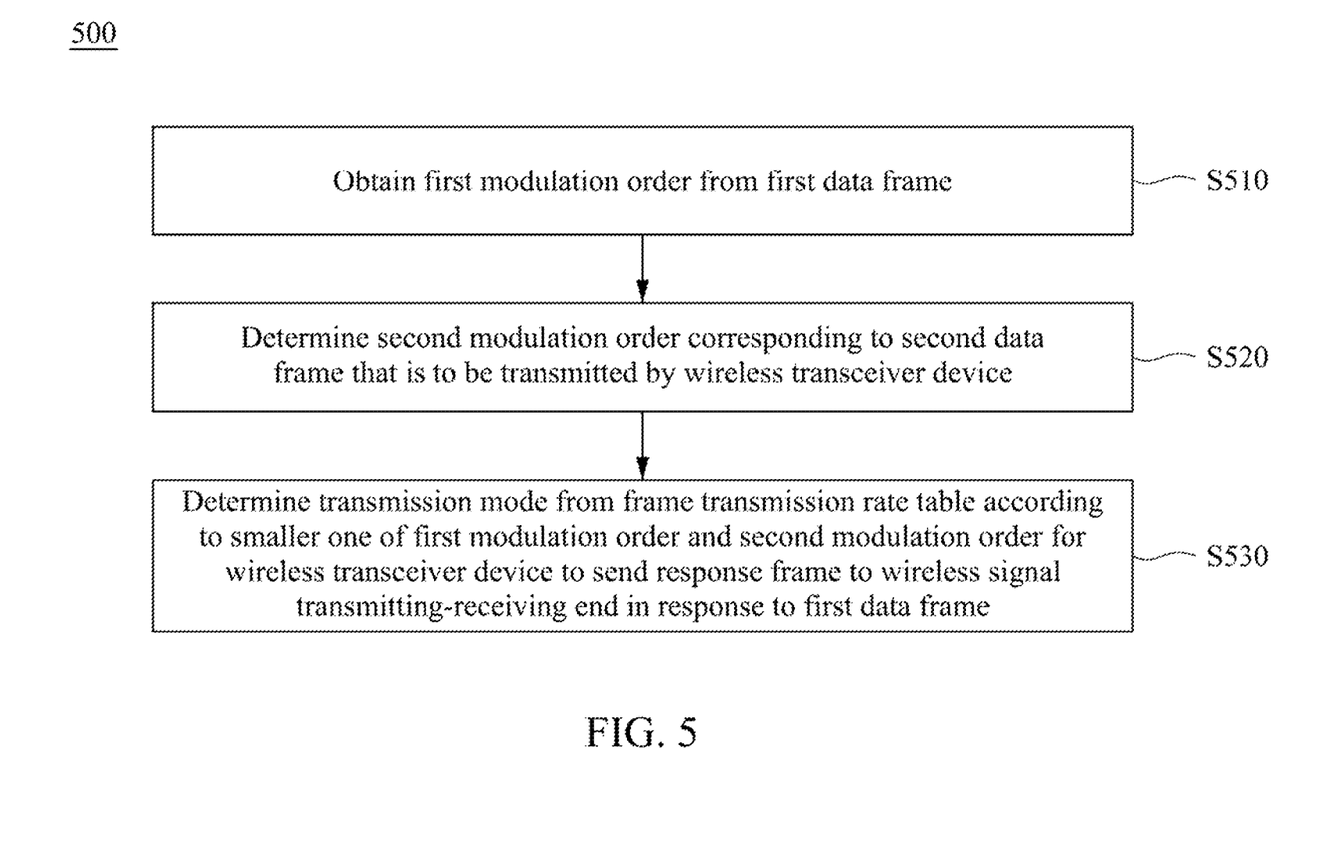
FIG. 5 is a flowchart of a wireless transmission rate control method in accordance with some embodiment of the present disclosure.

FIG. 5 is a flowchart of a wireless transmission rate control method 500 in accordance with some embodiments of the present disclosure. The wireless transmission rate control method 500 is adopted in a wireless transceiver device, e.g., the wireless transceiver device 110 or 120 of the wireless communication system 100 in FIG. 1, or another suitable wireless transceiver device. First, Operation S510 is performed to obtain a first modulation order from a first data frame that is transmitted by a wireless signal transmitting-receiving end. The first modulation order is associated with the transmission mode (information) and the modulation mode (information) of the first data frame. For example, if the transmission mode and the modulation mode of the first data frame are HE MCS3 and 16-QAM, respectively, then the corresponding first modulation order is 3, according to the content shown in Table 2.

Then, Operation S520 is performed to determine a second modulation order corresponding to a second data frame that is to be transmitted. The second modulation order may be associated with the signal transmission capability of the wireless transceiver device, such as the maximum transmission power, the supported transmission modes and/or the modulation modes of the wireless transceiver device, or may be associated with the wireless transceiver device and the wireless signal transmitting-receiving end, but is not limited thereto.

Afterwards, Operation S530 is performed to determine (e.g., select) a transmission mode from a frame transmission rate table according to a smaller one of the first modulation order and the second modulation order for sending a response frame to the wireless signal transmitting-receiving end in response to the first data frame. In some embodiments, the smaller modulation order of the first modulation order and the second modulation order corresponds to one or more available transmission modes, and the wireless transceiver device determines one of the available transmission modes with the maximum transmission rate as the transmission mode adopted for transmitting the response frame to the wireless signal transmitting-receiving end in response to the first data frame. In addition, in a scenario in which the transmission power of the wireless transceiver device is significantly lower than the transmission power of the wireless signal transmitting-receiving end (e.g., the wireless transceiver device and the wireless signal transmitting-receiving end are respectively a mobile device and an access point), the second modulation order is typically less than the first modulation order, and thus the available transmission modes for transmitting the response frame to the wireless signal transmitting-receiving end are dependent on the second modulation order.

In the following description, it is exemplified that the wireless transmission rate control method 500 is used for the wireless transceiver device 120 with the frame transmission rate table TB shown in FIG. 4. After receiving a first data frame that is transmitted by the wireless transceiver device 110 (i.e., the wireless signal transmitting-receiving end), if the wireless transceiver device 110 adopts the HE MCS4 transmission mode to transmit the first data frame to the wireless transceiver device 120, the modulation order corresponding to the HE MCS4 transmission mode is 3, and therefore the first modulation order obtain from the first data frame by the wireless transceiver device 120 is 3. When determining, by the wireless transceiver device 120, that the second modulation order corresponding to a second data frame to be transmitted (e.g., to the wireless transceiver device 110) is 2 according to the signal transmission capability thereof, the second modulation order is less than the first modulation order, and thus the wireless transceiver device 120 determines a transmission mode among OFDM 6M, OFDM 9M, OFDM 12M, and OFDM 18M transmission modes from the frame transmission rate table TB according to the second modulation order for transmitting a response frame to the wireless transceiver device 110 in response to the first data frame. That is, the transmission mode adopted by the wireless transceiver device 120 for transmitting the response frame to the wireless transceiver device 110 is one of OFDM 6M, OFDM 9M, OFDM 12M, and OFDM 18M transmission modes. In particular, the wireless transceiver device 120 may determine one of the available transmission modes of OFDM 6M, OFDM 9M, OFDM 12M, and OFDM 18M with the maximum transmission rate (i.e., OFDM 18M transmission mode) as the transmission mode adopted to transmit the response frame to the wireless transceiver device 110.

Summing up the above, according to the embodiments of the present disclosure, a wireless transceiver device can determine a suitable transmission rate before transmitting a response frame in response to a received data frame with lower transmission power, in order to avoid failing to successfully receive the response frame by the other wireless transceiver device with higher transmission power due to that the transmission power of the response frame does not meet the corresponding transmission rate requirement, thereby achieving the optimal transmission performance and effectively reducing the power consumption of the system.

It will be apparent to those skilled in the art that various modifications and variations can be made to the structure of the disclosure without departing from the scope or spirit of the disclosure cover modifications and variations of this disclosure provided they fall within the scope of the following claims.

What is claimed is:

1. A wireless transceiver device, comprising:
   a communication module used for receiving and demodulating a radio frequency signal from a wireless signal transmitting-receiving end into a first data frame; and
   a processor coupled to the communication module and configured to perform the following operations:
      obtaining a first modulation order from the first data frame;
      determining a second modulation order corresponding to a second data frame that is to be transmitted by the wireless transceiver device; and
      determining a transmission mode from a frame transmission rate table according to a smaller one of the first modulation order and the second modulation order for the wireless transceiver device to send a response frame to the wireless signal transmitting-receiving end in response to the first data frame.

2. The wireless transceiver device of claim 1, wherein the transmission mode is one of one or more available transmission modes with a maximum transmission rate corresponding to the smaller one of the first modulation order and the second modulation order.

3. The wireless transceiver device of claim 2, wherein the one or more available transmission modes is dependent on the second modulation order.

4. The wireless transceiver device of claim 1, wherein the first modulation order is associated with a transmission mode and a modulation mode of the first data frame.

5. The wireless transceiver device of claim 1, wherein the second modulation order is associated with a maximum transmission rate of the wireless transceiver device.

6. The wireless transceiver device of claim 1, wherein the transmission mode is OFDM 6M transmission mode, OFDM 9M transmission mode, OFDM 12M transmission mode, OFDM 18M transmission mode, OFDM 24M transmission mode, OFDM 36M transmission mode, OFDM 48M transmission mode, or OFDM 54M transmission mode.

7. The wireless transceiver device of claim 1, wherein the first data frame demodulated by the communication module is a High Throughput (HT) data frame, a Very High Throughput (VHT) data frame, or a High Efficiency (HE) data frame.

8. The wireless transceiver device of claim 1, further comprising:
   a memory configured to store the frame transmission rate table.

9. A wireless communication system having a first wireless transceiver device and a second wireless transceiver device that are communicatively connected to each other, in which the second wireless transceiver device is configured to perform the following operations after receiving a first data frame from the first wireless transceiver device:
   obtaining a first modulation order from the first data frame;
   determining a second modulation order corresponding to a second data frame that is to be transmitted by the second wireless transceiver device; and
   determining a transmission mode from a frame transmission rate table according to a smaller one of the first modulation order and the second modulation order for the second wireless transceiver device to send a response frame to the first wireless transceiver device in response to the first data frame.

10. The wireless communication system of claim 9, wherein the transmission mode is one of one or more available transmission modes with a maximum transmission rate corresponding to the smaller one of the first modulation order and the second modulation order.

11. The wireless communication system of claim 10, wherein the one or more available transmission modes is dependent on the second modulation order.

12. The wireless communication system of claim 9, wherein the transmission mode is OFDM 6M transmission mode, OFDM 9M transmission mode, OFDM 12M transmission mode, OFDM 18M transmission mode, OFDM 24M transmission mode, OFDM 36M transmission mode, OFDM 48M transmission mode, or OFDM 54M transmission mode.

13. The wireless communication system of claim 9, wherein the first data frame is transmitted by the first wireless transceiver device in a High Throughput (HT) mode, a Very High Throughput (VHT) mode, or a High Efficiency (HE) mode.

14. The wireless communication system of claim 9, wherein the second wireless transceiver device is a mobile wireless transceiver.

15. The wireless communication system of claim 9, wherein the first wireless transceiver device is an access point (AP).

16. A wireless transmission rate control method adapted to a wireless transceiver device, the wireless transmission rate control method comprising:
   receiving a first data frame that is transmitted by a wireless signal transmitting-receiving end;
   obtaining a first modulation order from the first data frame;
   determining a second modulation order corresponding to a second data frame that is to be transmitted by the wireless transceiver device; and
   determining a transmission mode from a frame transmission rate table according to a smaller one of the first modulation order and the second modulation order for the wireless transceiver device to send a response frame to the wireless signal transmitting-receiving end in response to the first data frame.

17. The wireless transmission rate control method of claim 16, wherein the transmission mode is one of one or more available transmission modes with a maximum transmission rate corresponding to the smaller one of the first modulation order and the second modulation order.

18. The wireless transmission rate control method of claim 17, wherein the one or more available transmission modes is dependent on the second modulation order.

19. The wireless transmission rate control method of claim 16, wherein the transmission mode is OFDM 6M transmission mode, OFDM 9M transmission mode, OFDM 12M transmission mode, OFDM 18M transmission mode, OFDM 24M transmission mode, OFDM 36M transmission mode, OFDM 48M transmission mode, or OFDM 54M transmission mode.

20. The wireless transmission rate control method of claim 16, wherein the received first data frame is a High Throughput (HT) data frame, a Very High Throughput (VHT) data frame, or a High Efficiency (HE) data frame.

* * * * *